United States Patent
Koster et al.

(10) Patent No.: US 7,562,190 B1
(45) Date of Patent: *Jul. 14, 2009

(54) CACHE PROTOCOL ENHANCEMENTS IN A PROXIMITY COMMUNICATION-BASED OFF-CHIP CACHE MEMORY ARCHITECTURE

(75) Inventors: Michael J. Koster, Fremont, CA (US); Brian W. O'Krafka, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/156,332

(22) Filed: Jun. 17, 2005

(51) Int. Cl.
*G06F 12/00* (2006.01)

(52) U.S. Cl. .............. 711/119; 711/118; 711/120; 711/121; 711/122; 711/129

(58) Field of Classification Search ............ None
See application file for complete search history.

(56) References Cited

U.S. PATENT DOCUMENTS

| | | |
|---|---|---|
| 5,276,851 A | 1/1994 | Thacker et al. |
| 5,502,828 A | 3/1996 | Shah |
| 5,974,493 A * | 10/1999 | Okumura et al. ............ 710/307 |
| 6,226,722 B1 | 5/2001 | Shippy et al. |
| 6,247,107 B1 | 6/2001 | Christie |
| 6,310,400 B1 | 10/2001 | Doyle et al. |
| 6,314,491 B1 * | 11/2001 | Freerksen et al. ........... 711/124 |
| 6,651,139 B1 | 11/2003 | Ozeki et al. |
| 6,892,290 B2 * | 5/2005 | Van Doren .................. 711/168 |
| 6,903,737 B2 | 6/2005 | Knittel |
| 6,938,128 B1 * | 8/2005 | Kuskin et al. ............... 711/141 |
| 7,395,375 B2 * | 7/2008 | Lais et al. ................... 711/141 |
| 2003/0154348 A1 | 8/2003 | Keltcher et al. |
| 2004/0059875 A1 * | 3/2004 | Garg et al. .................. 711/141 |

OTHER PUBLICATIONS

Drost et al. Proximity Communication, IEEE 2003 Custom Integrated Circuits Conference, 0-7803-7842-3/03, pp. 469-472.*

* cited by examiner

*Primary Examiner*—Hyung S Sough
*Assistant Examiner*—Kaushikkumar Patel
(74) *Attorney, Agent, or Firm*—Osha • Liang LLP

(57) ABSTRACT

A proximity interconnect module includes a plurality of processors operatively connected to a plurality of off-chip cache memories by proximity communication. Due to the high bandwidth capability of proximity interconnect, enhancements to the cache protocol to improve latency may be made despite resulting increased bandwidth consumption.

19 Claims, 7 Drawing Sheets

CACHE PROTOCOL ENHANCEMENTS IN A PROXIMITY COMMUNICATION-BASED OFF-CHIP CACHE MEMORY ARCHITECTURE

CROSS-REFERENCE TO RELATED APPLICATIONS

The present application contains subject matter that may be related to the subject matter in the following U.S. applications filed on Jun. 17, 2005 and assigned to the assignee of the present application: "Cache Preloading in a Proximity Communication-Based Off-Chip Cache Architecture" U.S. patent application Ser. No. 11/155,103; "Proximity Communication-Based Off-Chip Cache Memory Architectures" U.S. patent application Ser. No. 11/155,375; and "Speculative Memory Accesses in a Proximity Communication-Based Off-Chip Cache Memory Architecture" U.S. patent application Ser. No. 11/155,374.

BACKGROUND

As shown in FIG. 1, a computer system 10 includes at least a processor 12 and a main memory 14. The processor 12 has a central processing unit (CPU) 13 that is used to perform most, if not all, of the data processing and computing operations of the computer system 10. Data needed by or generated from the processor 12 may be stored in the main memory 14. However, because the speed of the processor 12 is typically significantly faster than that of the main memory 14, memory of smaller size and faster speed (referred to and known as "cache" memory) is often implemented to allow the processor 12 to access frequently and/or recently requested data faster than it would otherwise take to obtain such data from the main memory 14.

Still referring to FIG. 1, the processor 12 may also have an "on-chip" (i.e., on the same semiconductor die as the processor 12) cache memory 16 and an "off-chip" (i.e., not on the same semiconductor die as the processor 12) cache memory 18. When the processor 12 requests data, a cache controller (not shown) causes the "on-chip" cache memory 16 to be searched for the requested data. If the search in the "on-chip" cache memory 16 does not result in a "hit" (i.e., a cache "miss" occurs), the "off-chip" cache memory 18 is searched for the requested data. If the requested data is not found in the "off-chip" cache memory 18, the requested data is retrieved from the relatively slow main memory 14. In the case where data is retrieved from the main memory 14, either or both of the "on-chip" cache memory 16 and the "off-chip" cache memory 18 may be updated with that retrieved data.

Those skilled in the art will recognize that a processor may have any number of cache memory levels, which are typically referred to by number in order of decreasing proximity to the processor. Further, those skilled in the art will recognize that any number of cache memories may be "on-chip" and any number of cache memories may be "off-chip."

SUMMARY

According to one aspect of one or more embodiments of the present invention, a method of performing computer system operations comprises executing operations in a processor having an on-chip cache memory, where the processor is operatively connected to an off-chip cache memory, and where the off-chip cache memory is operatively connected to at least one other off-chip cache memory by proximity communication.

According to another aspect of one or more embodiments of the present invention, a system comprises a proximity interconnect module; a processor disposed on the proximity interconnect module, the processor having an on-chip cache memory; an off-chip cache memory operatively connected to the processor and operatively connected to at least one other off-chip cache memory by proximity communication.

Other aspects and advantages of the invention will be apparent from the following description and the appended claims.

DETAILED DESCRIPTION

Figure 1:
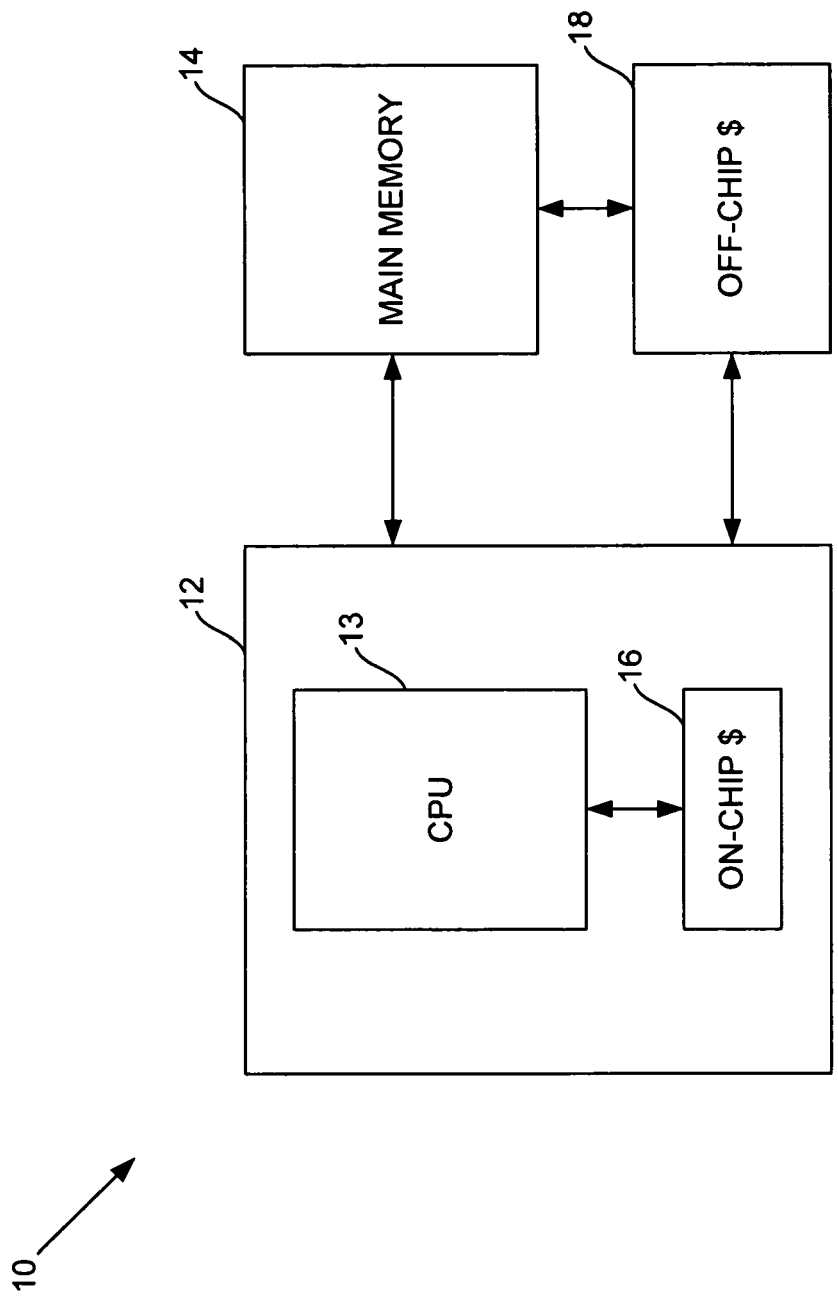
FIG. 1 shows a portion of a computer system.
Figure 2:
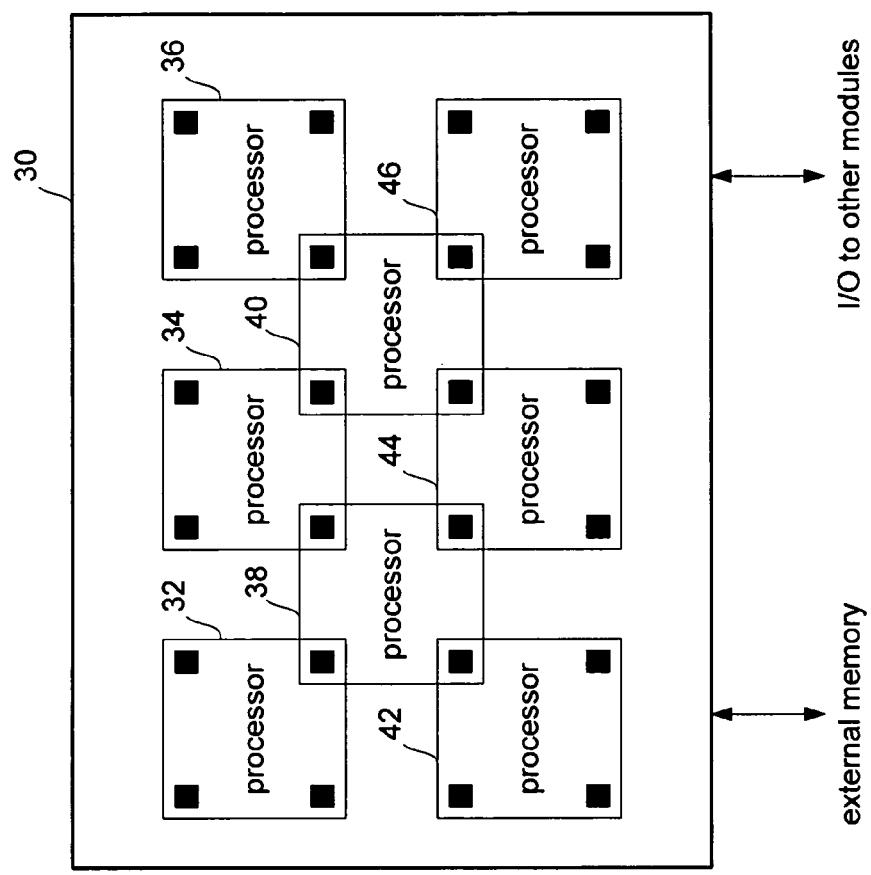
FIG. 2 shows a proximity interconnect module.

While a computer system such as that shown in FIG. 1 may be formed of a single processor, other computer systems may be formed of a plurality of computing modules, each having a plurality of processors. For example, as shown in FIG. 2, a computing module 30 may have processors 32, 34, 36, 38, 40, 42, 44, 46 and may be connected to an external main memory 48 and other computing modules (not shown). The processors 32, 34, 36, 38, 40, 42, 44, 46 are operatively connected to one another by a technique known and referred to as "proximity communication" (regions for proximity communication indicated by solid boxes shown at the corners of the processors 32, 34, 36, 38, 40, 42, 44, 46). A computing module having a proximity interconnect "switching fabric" may be referred to as a "proximity interconnect" module. In other words, a proximity interconnect module is a substrate upon which proximity communication is implemented for a collection of integrated circuits disposed on the substrate.

Proximity communication (also referred to and known as "proximity I/O communication") involves wireless data communication between closely-positioned integrated circuits. Instead of depending on relatively low-bandwidth physical interconnect (e.g, wires) for communicating data between integrated circuits, a proximity communication-enabled integrated circuit has embedded transmitting and receiving circuits that are "capacitively coupled" to respective receiving and transmitting circuits in another proximity communication-enabled integrated circuit. When capacitively coupled, a voltage change on a transmitting circuit induces a voltage change on a corresponding receiving circuit of the facing integrated circuit. This makes it possible to transmit signals directly between the integrated circuits without having to route the signal through intervening signal lines within, for example, a printed circuit board (PCB) or a ceramic multi-chip module (MCM). Further, those skilled in the art will note that proximity communication allows for higher bandwidth data communication than is typically possible with conventional interconnect (e.g., wires or PCB traces).

Figure 3A:
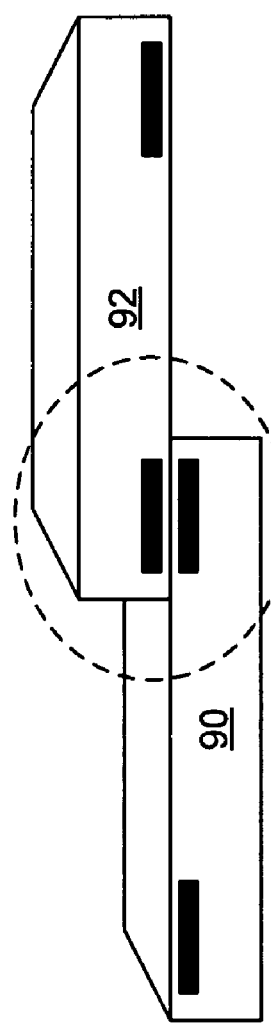
FIGS. 3A and 3B show integrated circuits configured for proximity communication.
Figure 3B:
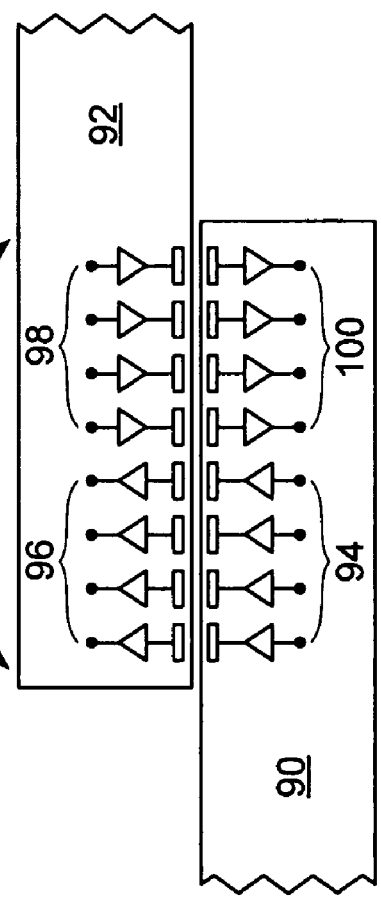

FIGS. 3A and 3B show integrated circuits configured for proximity communication. In FIGS. 3A and 3B, a first integrated circuit 90 is positioned for proximity communication with a second integrated circuit 92. Using, for example, capacitive coupling as described above, data is capable of being transferred (i) from transmitting circuits 94 of the first integrated circuit 90 to receiving circuits 96 of the second integrated circuit 92 and (ii) from transmitting circuits 98 of the second integrated circuit 92 to receiving circuits 100 of the first integrated circuit 90.

While the processors 32, 34, 36, 38, 40, 42, 44, 46 shown in FIG. 2 share main memory 48, in one or more embodiments of the present invention, off-chip cache memories are interspersed within a proximity communication fabric of a given proximity interconnect module. In other words, embodiments of the present invention generally relate to techniques and designs for connecting off-chip cache memories with processors in a proximity communication-based fabric. In essence, those skilled in the art will note that such interspersed off-chip cache memories may be viewed as a unitary off-chip cache memory.

Figure 4:
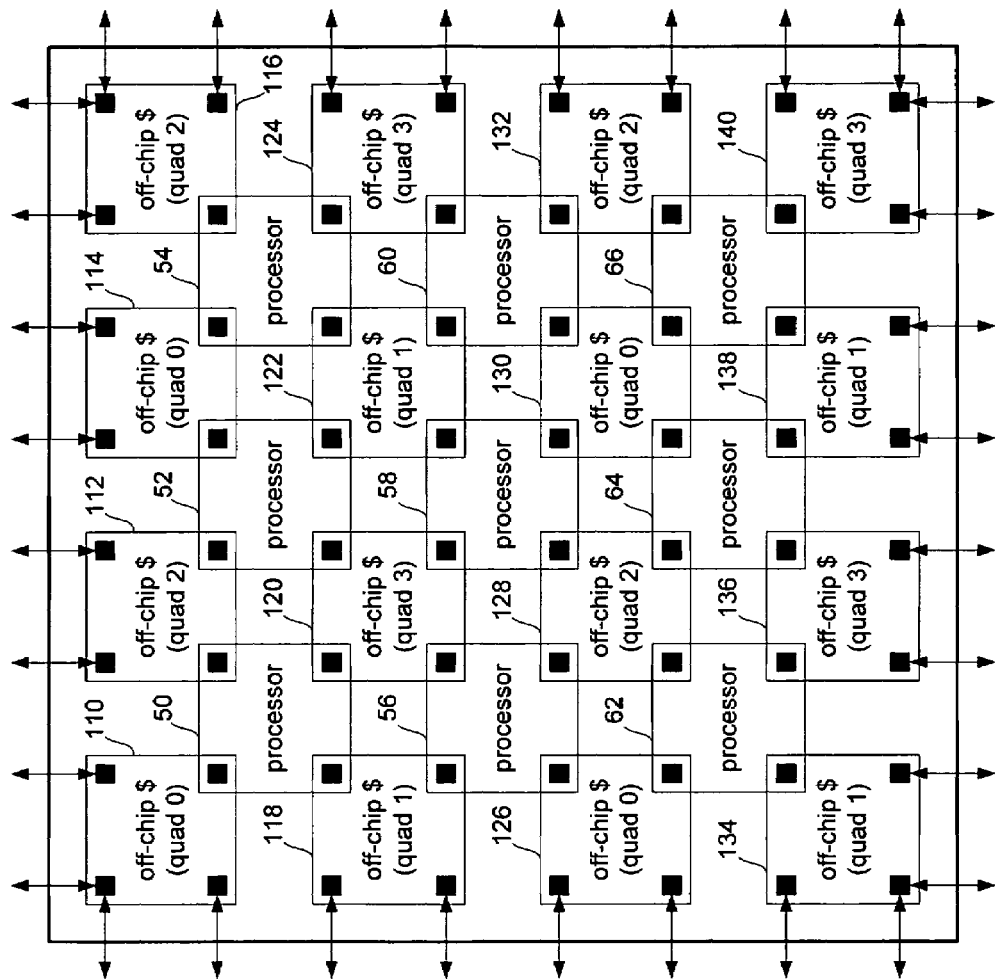
FIG. 4 shows a system architecture in accordance with an embodiment of the present invention.

FIG. 4 shows an exemplary system architecture in accordance with an embodiment of the present invention. In FIG. 4, processors 50, 52, 54, 56, 58, 60, 62, 64, 66 are interspersed with off-chip cache memories 110, 112, 114, 116, 118, 120, 122, 124, 126, 128, 130, 132, 134, 136, 138, 140 such that each processor 50, 52, 54, 56, 58, 60, 62, 64, 66 is connected by proximity communication to a different off-chip cache memory at each of its four corners. Similarly, each off-chip cache memory 110, 112, 114, 116, 118, 120, 122, 124, 126, 128, 130, 132, 134, 136, 138, 140 (except those at the edges of proximity interconnect module 49) is connected by proximity communication to a different processor at each of its four corners.

In one or more embodiments of the present invention, each off-chip cache memory 110, 112, 114, 116, 118, 120, 122, 124, 126, 128, 130, 132, 134, 136, 138, 140 caches data for all four processors to which it is attached. Physical address space may be divided into four quadrants, where a particular off-chip cache memory caches data from a particular one of the four quadrants. The quadrants may be assigned to the off-chip cache memories 110, 112, 114, 116, 118, 120, 122, 124, 126, 128, 130, 132, 134, 136, 138, 140 such that each processor is connected by proximity communication to an off-chip cache memory from each quadrant. In such a manner, because any given processor 50, 52, 54, 56, 58, 60, 62, 64, 66 is "locally" connected to four off-chip cache memories that each hold cached data belonging to a different quadrant of the physical address space, each processor 50, 52, 54, 56, 58, 60, 62, 64, 66 may be characterized as having its own complete off-chip cache memory.

Those skilled in the art will note that because there is more than one off-chip cache memory for each quadrant in FIG. 4, in one or more embodiments of the present invention, a cache coherence protocol to maintain consistence among the off-chip cache memories may be implemented and supported.

Those skilled in the art will note that at the edges of proximity interconnect module 49, off-module interconnect (e.g., cables, backplane buses) may be used to access off-module memory controllers, input/output ("I/O") interfaces, and module-to-module interconnect.

Those skilled in the art will note that in one or more embodiments of the present invention, each off-chip cache memory quadrant may have end-around connections so as to reduce a "hop" count incident with traversing the proximity interconnect module.

Those skilled in the art will note that in one or more other embodiments of the present invention, the physical address space may be divided into any number of portions. For example, the physical address space may be divided into two portions instead of four.

Figure 5:
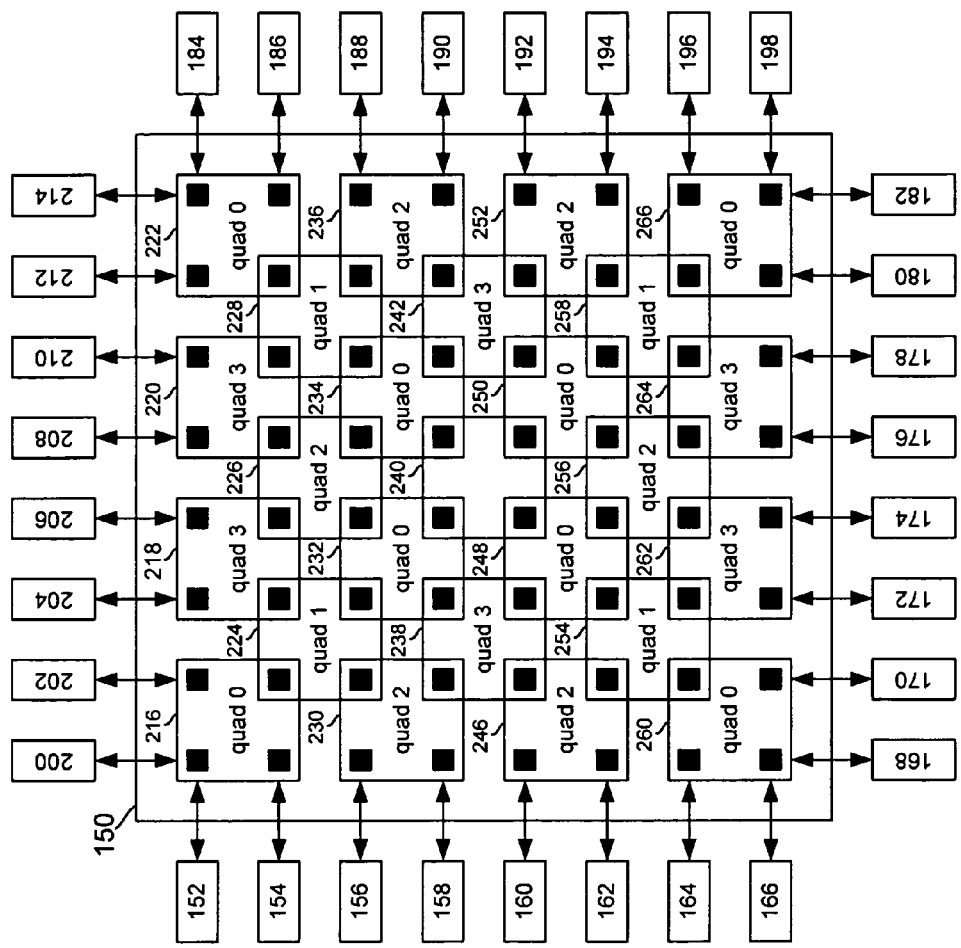
FIG. 5 shows a system architecture in accordance with an embodiment of the present invention.

FIG. 5 shows an exemplary system architecture in accordance with an embodiment of the present invention. In FIG. 5, processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214 are connected to a proximity interconnect module 150 having an array of off-chip cache memories 216, 218, 220, 222, 226, 228, 230, 232, 234, 236, 238, 240, 242, 244, 246, 248, 250, 252, 254, 256, 258, 260, 262, 264, 266.

Within the proximity interconnect module 150, an array of similar off-chip cache memories 216, 218, 220, 222, 226, 228, 230, 232, 234, 236, 238, 240, 242, 244, 246, 248, 250, 252, 254, 256, 258, 260, 262, 264, 266 is interconnected such that a small group of off-chip cache memories forms the off-chip cache memory for a given processor. The off-chip cache memories in these groups cache addresses in distinct, statically defined regions of the physical address space. As shown in FIG. 5, each off-chip cache memory 216, 218, 220, 222, 226, 228, 230, 232, 234, 236, 238, 240, 242, 244, 246, 248, 250, 252, 254, 256, 258, 260, 262, 264, 266 is designated as being one of four quadrants into which the physical address space of the total off-chip cache is divided. Further, those skilled in the art will note that in one or more embodiments of the present invention, a particular off-chip cache memory may be shared by a relatively small number of processors.

In one or more embodiments of the present invention, each off-chip cache memory 216, 218, 220, 222, 226, 228, 230, 232, 234, 236, 238, 240, 242, 244, 246, 248, 250, 252, 254, 256, 258, 260, 262, 264, 266 may have several switches that have connections to neighboring off-chip cache memories using proximity communication at the corners of its package. The switches implement a fabric that may carry cache-coherence traffic among multiple off-chip cache memories caching the same address region (e.g., off-chip cache memories of the same quadrant in FIG. 5). This fabric may also carry cache-coherence traffic between the off-chip cache memories 216, 218, 220, 222, 226, 228, 230, 232, 234, 236, 238, 240, 242, 244, 246, 248, 250, 252, 254, 256, 258, 260, 262, 264, 266 and the processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214.

Those skilled in the art will note that in one or more embodiments of the present invention, because proximity communication may be sufficiently dense enough to allow the architecture shown in FIG. 5 to support a low latency snooping-based cache-coherence protocol by confining high bandwidth snoop traffic to the proximity interconnect module 150. The off-chip cache memories 216, 218, 220, 222, 226, 228, 230, 232, 234, 236, 238, 240, 242, 244, 246, 248, 250, 252, 254, 256, 258, 260, 262, 264, 266 may filter out irrelevant snoop traffic that would otherwise saturate one or more of the processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214. Those skilled in the art will note that such filtering is particularly important when dealing with relatively narrow processor interfaces (e.g., HyperTransport).

Those skilled in the art will note that in one or more embodiments of the present invention, one or more of processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214 may be connected to its own memory (not shown).

Those skilled in the art will note that in one or more embodiments of the present invention, each off-chip cache memory quadrant may have end-around connections so as to reduce a "hop" count incident with traversing the proximity interconnect module.

Figure 6:
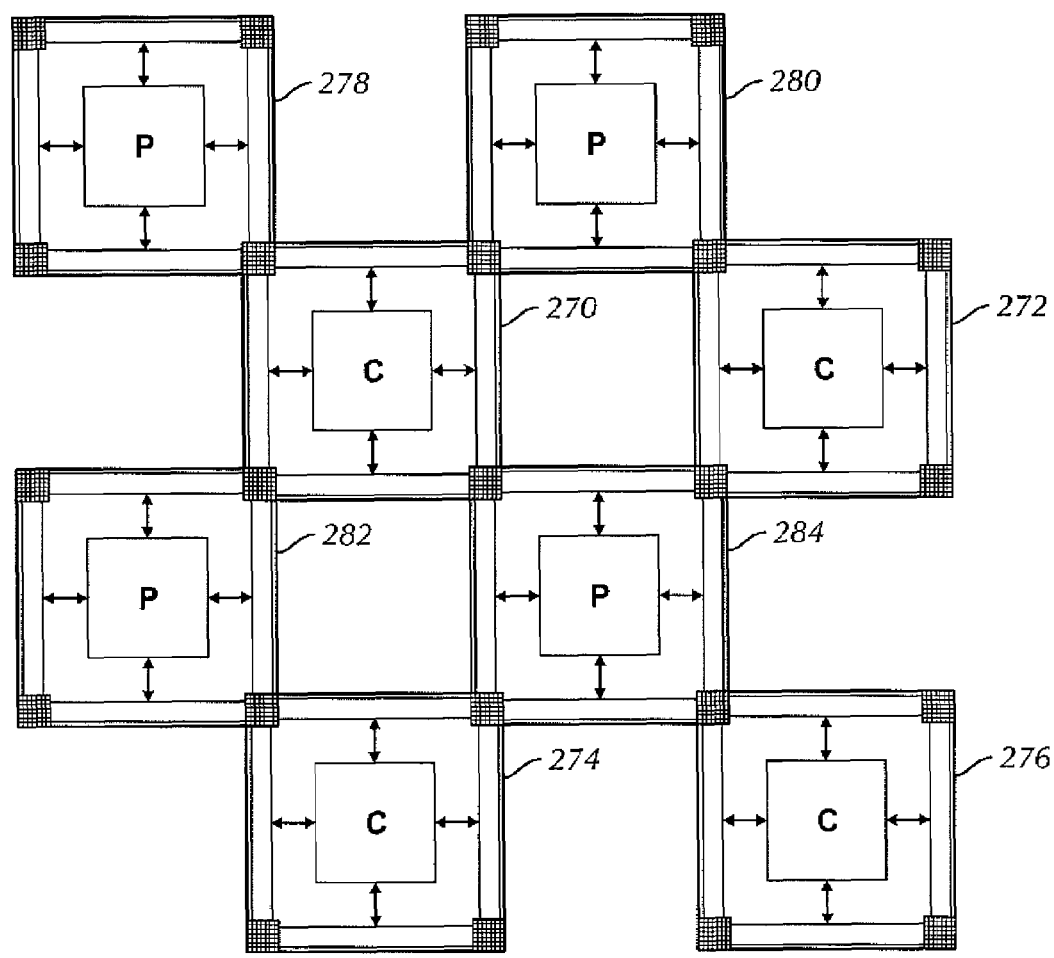
FIG. 6 shows a system architecture in accordance with an embodiment of the present invention.

FIG. 6 shows an exemplary system architecture in accordance with an embodiment of the present invention. In FIG. 6, off-chip cache memories 270, 272, 274, 276 having cache memory and controller logic are distributed along with processors 278, 280, 282, 284 in a proximity communication fabric such that any processor 278, 280, 282, 284 may retrieve data from any off-chip cache memory 270, 272, 274, 276.

Those skilled in the art will note that in one or more embodiments of the present invention, the off-chip cache memories 270, 272, 274, 276 may constitute a relatively large, address-interleaved, multi-bank, set-associative, shared off-chip cache memory.

Figure 7:
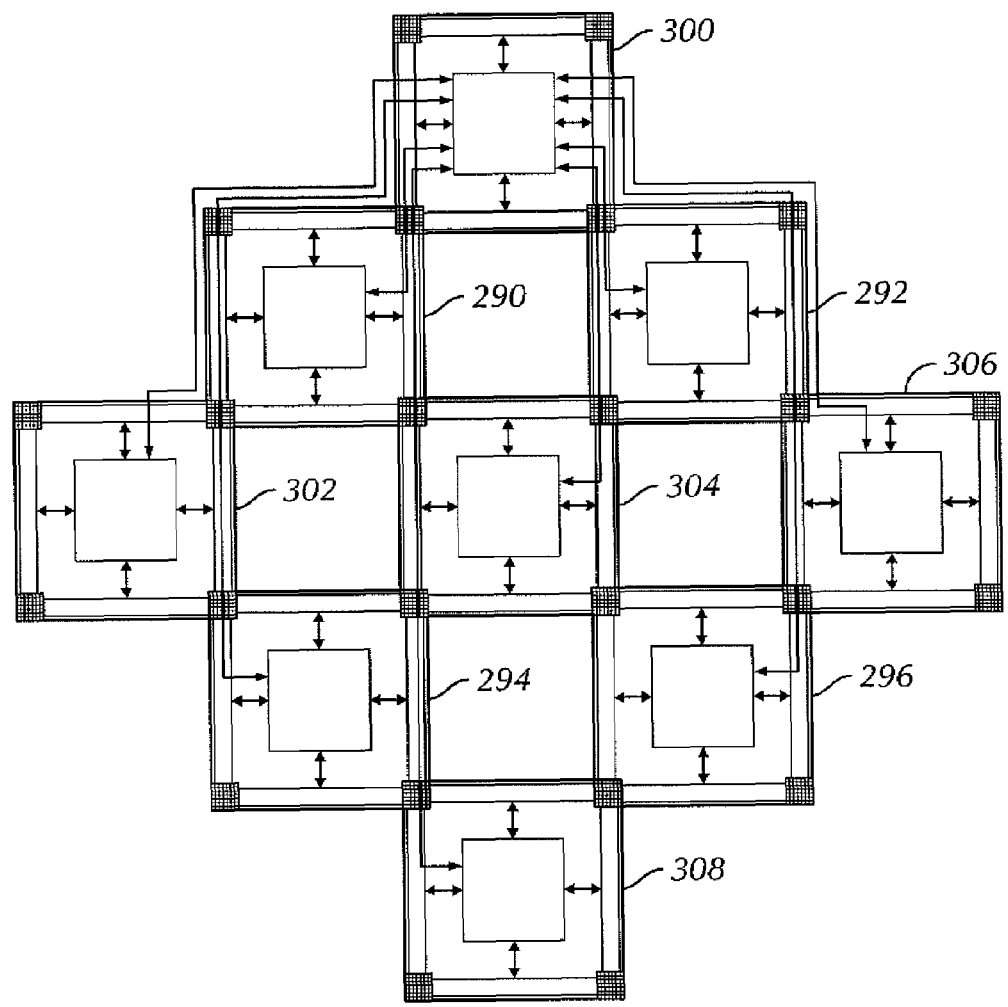
FIG. 7 shows a system architecture in accordance with an embodiment of the present invention.

FIG. 7 shows an exemplary system architecture in accordance with an embodiment of the present invention. In FIG. 7, off-chip cache memories 290, 292, 294, 296 having cache memory and controller logic are distributed along with processors 300, 302, 304, 306, 308 in a fully-connected crossbar switch fabric formed of proximity interconnect and hard-wired paths (shown by arrows in FIG. 7) such that any processor may retrieve data from any off-chip cache memory. In one or more embodiments of the present invention, the processors 300, 302, 304, 306, 308 and the off-chip cache memories 290, 292, 294, 296 may be interconnected using dedicated point-to-point wiring connections enabled by the large number of available conductors in the proximity interconnect grid.

Those skilled in the art will note that in one or more embodiments of the present invention, full connection routing may require dedicated physical paths for each combination of endpoints.

As shown above in FIGS. 4-7, embodiments of the present invention relate to proximity communication-based off-chip cache memory architectures. Such architectures use the high bandwidth capability and low latency of proximity interconnect technology to create a large distributed off-chip cache memory that is shared among two or more processors on a proximity communication-based proximity interconnect module.

Conventional cache protocols have been typically optimized to conserve interconnect bandwidth. However, by using the proximity interconnect technology described in the various proximity communication-based off-chip cache memory architectures with reference to FIG. 4-7, greater bandwidth may be used to further minimize latency. In general, in one or more embodiments of the present invention, a cache protocol may be designed to optimize latency for frequent cache operations.

For example, in one or more embodiments of the present invention, for certain on-chip cache memory write misses and write upgrades, instead of invalidating a particular off-chip cache memory entry, the off-chip cache memory may be updated with the new data value from the on-chip cache memory. Those skilled in the art will note that in such a manner, there may be an increase in the probability of a subsequent read reference from another processor being satisfied by the off-chip cache memory instead of having to "snoop" any on-chip cache memories. In one or more other embodiments of the present invention, a "write once" state may be defined in the on-chip cache memory that would inhibit subsequent off-chip cache memory updates and revert instead to the invalidate protocol for cases of multiple updates from the same processor.

In one or more embodiments of the present invention, when a read from a processor results in clean data being supplied from main memory, the clean data may be written to both the on-chip cache memory and the off-chip cache memory of the requesting processor. When another processor subsequently reads the same cache line, the default action may be to initiate a read from the off-chip cache memory. However, in some cases, a nearby on-chip cache memory may supply data if it also has a copy in the shared state. When using speculative on-chip cache memory snooping, this protocol may allow nearby on-chip cache memories to supply data from the shared state. In one or more embodiments of the present invention, when multiple on-chip cache memories and off-chip cache memories all send data in response, the initiating processor may load its cache from the first response to arrive and ignore subsequent responses.

In one or more embodiments of the present invention, when using private or limited sharing of off-chip cache memories, a system may propagate references to a nearby or local off-chip cache memory and perform an off-chip cache memory lookup on a "best effort" basis; that is, the request will be tagged with a lower priority and may only be performed if the system is relatively idle.

In one or more embodiments of the present invention, when a write upgrade operation is performed in an on-chip cache memory, its corresponding off-chip cache memory is placed in a special "directory" mode in which the data contents that would normally be invalid are now used to store a pointer to the "owning" on-chip cache memory. When another processor performs a subsequent read operation, the off-chip cache memory in directory mode may be used to initiate a directed read operation to the modified data in the "owning" on-chip cache memory. At this point, the off-chip cache memory directory may store a pointer to both the "owning" on-chip cache memory and the "sharing" cache memory (e.g., the off-chip cache memory of the processor that is requesting that data pointed to by the off-chip cache memory in the directory mode). The off-chip cache memory may continue to operate in directory mode, storing a pointer to the "owning" on-chip cache memory and a bit map of all sharing cache memories. Those skilled in the art will note that in such a manner, the latency of subsequent write upgrades is reduced by only needing to multicast to the cache memories that actually have copies of the requested data, rather than having to do a system-wide multicast.

Advantages of the present invention may include one or more of the following. In one or more embodiments of the present invention, the use of proximity communication in a cache architecture allows for increased bandwidth, thereby potentially leading to improved performance.

In one or more embodiments of the present invention, the use of proximity communication in a cache architecture allows for the implementation and use of off-chip cache memories, thereby reducing memory access times by reducing accesses to main memory.

In one or more embodiments of the present invention, the use of proximity communication in a cache architecture having off-chip cache memories allows for lower cache access times as opposed to that incurred with conventional interconnect.

In one or more embodiments of the present invention, because the use of proximity communication in a cache architecture allows for increased connectivity, more off-chip cache memories may be implemented, thereby improving cache performance.

In one or more embodiments of the present invention, because computer system throughput is in part dependent on and limited by the size, latency, and "sharedness" of an off-chip cache memory, embodiments of the present invention may enable substantial improvements in these aspects, thereby improving system performance.

In one or more embodiments of the present invention, within a proximity interconnect module, fast and wide off-chip cache memory interfaces may be integrated with wide fast connections provided by proximity interconnect at the four corners of each chip. Because the feasible off-chip signal count of proximity interconnect is markedly greater than that of conventional interconnect, a higher performance system may be possible.

In one or more embodiments of the present invention, because the high signal count of proximity interconnect allows for multiple wide, fast connections between off-chip cache memories on a proximity interconnect module, an off-chip cache memory may be constructed using several smaller chips of moderate cost rather than a single chip of high cost.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of performing operations in a computer system, comprising:
    receiving, from a first processor comprising an on-chip cache memory, a first read request for a data item stored in a physical memory;
    writing the data item to the on-chip cache memory and to a first off-chip cache memory, wherein the first off-chip cache memory overlaps a first corner of the first processor and communicates with the first processor using proximity communication;
    receiving, from a second processor, a second read request for the data item;
    receiving, at the second processor, a plurality of responses from the first off-chip cache memory and the on-chip cache memory, wherein each of the plurality of responses comprises the data item;
    accepting, at the second processor, a first response of the plurality of responses; and
    discarding, at the second processor, a second response of the plurality of responses,
    wherein the first off-chip cache memory extends past a perimeter of the first processor and further overlaps a first corner of a third processor, a second off-chip cache memory overlaps a second corner of the first processor, a third off-chip cache memory overlaps a third corner of the first processor, and a fourth off-chip cache memory overlaps a fourth corner of the first processor in the computer system, and
    wherein the second off-chip cache memory, the third off-chip cache memory, and the fourth off-chip cache memory communicate with the first processor using proximity communication.

2. The method of claim 1, wherein the first off-chip cache memory is configured to cache data for the first processor from a first region of a physical address space in the physical memory, wherein the second off-chip cache memory is configured to cache data for the first processor from a second region of the physical address space, wherein the third off-chip cache memory is configured to cache data for the first processor from a third region of the physical address space, and wherein the fourth off-chip cache memory is configured to cache data for the first processor from a fourth region of the physical address space.

3. The method of claim 1, wherein the proximity communication is performed using capacitive coupling.

4. The method of claim 1, wherein the proximity communication is performed using inductive coupling.

5. The method of claim 1, wherein the proximity communication is performed using optical coupling.

6. The method of claim 1, wherein the first off-chip cache memory communicates with the third processor using proximity communication.

7. The method of claim 6, wherein the first off-chip cache memory further overlaps a first corner of a fourth processor in the computer system and communicates with the fourth processor using proximity communication.

8. The method of claim 1, wherein a fifth off-chip cache memory overlaps a corner of the second processor and communicates with the second processor and the first off-chip cache memory using proximity communication.

9. The method of claim 8, further comprising:
    writing a new value to the on-chip cache memory;
    storing, in the first off-chip cache memory, a pointer to the on-chip cache memory in response to writing the new value on the on-chip cache memory;
    receiving, from the fifth off-chip cache memory, a request for the new value;
    sending the new value to the fifth off-chip cache memory; and
    storing, in the first off-chip cache memory, a pointer to the fifth off-chip cache memory in response to sending the new value to the fifth off-chip cache memory.

10. The method of claim 1, further comprising:
    writing a new value to the on-chip cache memory;
    loading the new value in the first off-chip cache memory;
    receiving, from the second processor, a request for the new value; and
    sending the new value from the first off-chip cache memory to the second processor without searching the on-chip cache memory of the first processor.

11. A system, comprising:
    a proximity interconnect module;
    a first processor disposed on the proximity interconnect module, wherein the first processor comprises an on-chip cache memory;
    a second processor disposed on the proximity interconnect module;
    a physical memory comprising a physical address space;
    a first off-chip cache memory overlapping a first corner of the first processor and overlapping a first corner of a third processor, wherein the first off-chip cache memory extends past a perimeter of the first processor;
    a second off-chip cache memory overlapping a second corner of the first processor;
    a third off-chip cache memory overlapping a third corner of the first processor; and
    a fourth off-chip cache memory overlapping a fourth corner of the first processor,
    wherein the first off-chip cache memory, the second off-chip cache memory, the third off-chip cache memory, and the fourth off-chip cache memory communicate with the first processor using proximity communication,
    wherein the first off-chip cache memory, the second off-chip cache memory, the third off-chip cache memory, and the fourth off-chip cache memory are configured to cache data for the first processor from, respectively, a first region of the physical address space, a second region of the physical address space, a third region of the physical address space, and a fourth region of the physical address space, and wherein the first processor is configured to request a data item from the physical memory, and write the data item to the on-chip cache memory and the first off-chip cache memory, and wherein the second processor is configured to issue a read request for the data item, receive a plurality of responses to the read request from the on-chip cache memory and the first off-chip cache memory, accept a first response of the plurality of responses, and discard a second response of the plurality of responses.

12. The system of claim 11, wherein the proximity communication is performed using capacitive coupling.

13. The system of claim 11, wherein the proximity communication is performed using inductive coupling.

14. The system of claim 11, wherein the proximity communication is performed using optical coupling.

15. The system of claim 11, the first off-chip cache memory communicates with the third processor using proximity communication.

16. The system of claim 15, further comprising:
a fourth processor disposed on the proximity interconnect module, wherein the first off-chip cache memory further overlaps a first corner of the fourth processor and communicates with the fourth processor using proximity communication.

17. The system of claim 11, further comprising:
a fifth off-chip cache memory overlapping a first corner of the second processor, wherein the fifth off-chip cache memory is configured to communicate with the second processor and the first off-chip cache memory using proximity communication.

18. The system of claim 17, wherein the on-chip cache memory is configured to store a new value, wherein the first off-chip cache memory is configured to store a pointer to the on-chip cache memory, wherein the fifth off-chip cache memory is configured to issue a request for the new value, and wherein the first off-chip cache memory is further configured to store a pointer to the fifth off-chip cache memory after the new value is sent to the fifth off-chip cache memory.

19. The system of claim 11, wherein the on-chip cache memory and the first off-chip cache memory are configured to store a new value, wherein the second processor is further configured to issue a request for the new value, and wherein the new value is sent to the second processor without searching the on-chip cache memory.

* * * * *

UNITED STATES PATENT AND TRADEMARK OFFICE
CERTIFICATE OF CORRECTION

PATENT NO. : 7,562,190 B1
APPLICATION NO. : 11/156332
DATED : July 14, 2009
INVENTOR(S) : Michael J. Koster et al.

Page 1 of 1

It is certified that error appears in the above-identified patent and that said Letters Patent is hereby corrected as shown below:

In Claim 9, Column 8 (line 25), "value on" should read --value <u>to</u>--.

Signed and Sealed this

Eighth Day of September, 2009

David J. Kappos
*Director of the United States Patent and Trademark Office*